US011347499B1

(12) United States Patent
Talmor et al.

(10) Patent No.: US 11,347,499 B1
(45) Date of Patent: May 31, 2022

(54) MERGING MULTIPLE PACKAGE FILES INTO A MERGED PACKAGE FILE

(71) Applicant: Red Hat, Inc., Raleigh, NC (US)

(72) Inventors: Avraham Talmor, Ra'anana (IL); Ilan Gersht, Ra'anana (IL); Arie Bregman, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/123,892

(22) Filed: Dec. 16, 2020

(51) Int. Cl.
*G06F 8/658* (2018.01)
*H04L 67/06* (2022.01)
*G06F 8/71* (2018.01)
*G06F 8/61* (2018.01)

(52) U.S. Cl.
CPC ............... *G06F 8/658* (2018.02); *G06F 8/61* (2013.01); *G06F 8/71* (2013.01); *H04L 67/06* (2013.01)

(58) Field of Classification Search
CPC ... H04L 67/06; G06F 8/61; G06F 8/71; G06F 8/658
See application file for complete search history.

(56) References Cited

U.S. PATENT DOCUMENTS

| | | | | |
|---|---|---|---|---|
| 6,223,345 B1 * | 4/2001 | Jones | ............... | G06F 8/60 709/220 |
| 8,185,872 B2 * | 5/2012 | Harmsen | ............... | G06F 8/60 717/121 |
| 8,286,132 B2 | 10/2012 | Yuan et al. | | |
| 9,760,365 B2 | 9/2017 | Johansson et al. | | |
| 9,841,966 B2 | 12/2017 | Alevoor et al. | | |
| 10,698,673 B2 | 6/2020 | Lubyanskyy | | |
| 2014/0173559 A1 * | 6/2014 | Tiwari | ............... | G06F 8/31 717/122 |
| 2015/0379023 A1 | 12/2015 | Shabtay et al. | | |
| 2019/0196793 A1 * | 6/2019 | Jai | ............... | G06F 8/34 |

(Continued)

OTHER PUBLICATIONS

Jeremy Davis, "Merging package definitions", Nov. 3, 2014, retrieved from <https://jermdavis.wordpress.com/2014/11/03/merging-package-definitons/>, total p. 6. (Year: 2014).*

(Continued)

*Primary Examiner* — Marina Lee
(74) *Attorney, Agent, or Firm* — Withrow & Terranova, PLLC

(57) ABSTRACT

Merging multiple package files into a merged package file is disclosed herein. In some examples, a processor device of a computing device retrieves a first package specification file corresponding to a first package file and a second package specification file corresponding to a second package file. The first package specification file and the second package specification file are next merged into a merged package specification file. Finally, a merged package file is generated based on the merged package specification file. The merged package file includes a first plurality of constituent files of the first package file and a second plurality of constituent files of the second package file, and in some examples may include a third plurality of constituent files of a dependency package file on which the first or the second package file depends. The merged package file thus enables more efficient and convenient software distribution and installation.

17 Claims, 8 Drawing Sheets

(56) References Cited

U.S. PATENT DOCUMENTS

2019/0303138 A1* 10/2019 Szulman ............... G06F 16/168
2019/0324733 A1* 10/2019 Lubyanskyy ............. G06F 8/76

OTHER PUBLICATIONS

Unknown Author, "Merge Package Directly with XMI," Sparx Systems Pty Ltd., Available online at https://sparxsystems.com/enterprise_architect_user_guide/14.0/model_publishing/merge_package_directly.html, Accessed inline Oct. 29, 2020, 2 pages.
Unknown Author, "Merging Two Packages," Oracle, Available online at https://docs.oracle.com/cd/E36784_01/html/E36856/glyux.html, 2012, updated Jul. 2014, 1 page.
Xing, Xiaoqian et al., "Automatic Software Merging using Automated Program Repair," 2019 IEEE 1st International Workshop on Intelligent Bug Fixing (IBF), Available online at https://ieeexplore.IEEE.org/document/8665493, 2019, pp. 11-16.

* cited by examiner

← 92

```
COMBINE EACH CORRESPONDING BODY SECTION OF THE FIRST PLURALITY OF BODY
SECTIONS OF THE FIRST PACKAGE SPECIFICATION FILE AND THE SECOND PLURALITY
OF BODY SECTIONS OF THE SECOND PACKAGE SPECIFICATION FILE INTO A COMBINED
         BODY SECTION OF THE MERGED PACKAGE SPECIFICATION FILE
                                  94
```

DETECT A CONFLICT BETWEEN A FIRST CORRESPONDING BODY SECTION OF THE FIRST PLURALITY OF BODY SECTIONS AND A SECOND CORRESPONDING BODY SECTION OF THE SECOND PLURALITY OF BODY SECTIONS
96

RESOLVE THE CONFLICT BASED ON A USER INPUT OR A DEFAULT CONFLICT RESOLUTION RULE
98

STORE STATE INFORMATION INDICATING A CURRENT STATE OF THE COMBINING OF THE FIRST CORRESPONDING BODY SECTION AND THE SECOND CORRESPONDING BODY SECTION
100

ABORT THE COMBINING OF THE FIRST CORRESPONDING BODY SECTION AND THE SECOND CORRESPONDING BODY SECTION
102

SUBSEQUENTLY RESUME THE COMBINING OF THE FIRST CORRESPONDING BODY SECTION AND THE SECOND CORRESPONDING BODY SECTION BASED ON THE STATE INFORMATION
104

*FIG. 4*

MERGING MULTIPLE PACKAGE FILES INTO A MERGED PACKAGE FILE

BACKGROUND

The term "package file" and derivatives thereof are used herein to refer to a file (such as an RPM Package Manager (RPM) file, as a non-limiting example) that encapsulates software source code files and/or or binary files and their associated metadata. A package file may be used in conjunction with an appropriate package management tool to install, reinstall, remove, upgrade, and verify a software application, and may be digitally signed to enable users to verify the authenticity of the package file.

SUMMARY

The examples disclosed herein relate to merging multiple package files into a merged package file. In this regard, in some examples, a computing device performs a package file merge by retrieving a first package specification file corresponding to a first package file and a second package specification file corresponding to a second package (e.g., by executing a package merge command that specifies the first package file and the second package file, or that specifies the first package specification file and the second package specification file, as non-limiting examples). The first package specification file and the second package specification file are next merged into a merged package specification file. Finally, a merged package file is generated based on the merged package specification file. The merged package file includes a first plurality of constituent files of the first package file and a second plurality of constituent files of the second package file. In this manner, the merged package file may enable more efficient and convenient distribution and installation of the software applications provided by the first package file and the second package file.

In another example, a method is provided. The method comprises retrieving, by a computing device, a first package specification file corresponding to a first package file and a second package specification file corresponding to a second package file. The method further comprises merging the first package specification file and the second package specification file into a merged package specification file. The method also comprises generating a merged package file based on the merged package specification file, wherein the merged package file comprises a first plurality of constituent files of the first package file and a second plurality of constituent files of the second package file.

In another example, a computing device is provided. The computing device comprises a system memory and a processor device coupled to the system memory. The processor device is to retrieve a first package specification file corresponding to a first package file and a second package specification file corresponding to a second package file. The processor device is further to merge the first package specification file and the second package specification file into a merged package specification file. The processor device is also to generate a merged package file based on the merged package specification file, wherein the merged package file comprises a first plurality of constituent files of the first package file and a second plurality of constituent files of the second package file.

In another example, a computer program product is provided. The computer program product is stored on a non-transitory computer-readable medium, and includes computer-executable instructions to cause a processor device to retrieve a first package specification file corresponding to a first package file and a second package specification file corresponding to a second package file. The computer-executable instructions further cause the processor device to merge the first package specification file and the second package specification file into a merged package specification file. The computer-executable instructions also cause the processor device to generate a merged package file based on the merged package specification file, wherein the merged package file comprises a first plurality of constituent files of the first package file and a second plurality of constituent files of the second package file.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 4 is a flowchart illustrating exemplary operations for resolving conflicts between corresponding body sections of two package specification files, according to one example;

DETAILED DESCRIPTION

Figure 1:
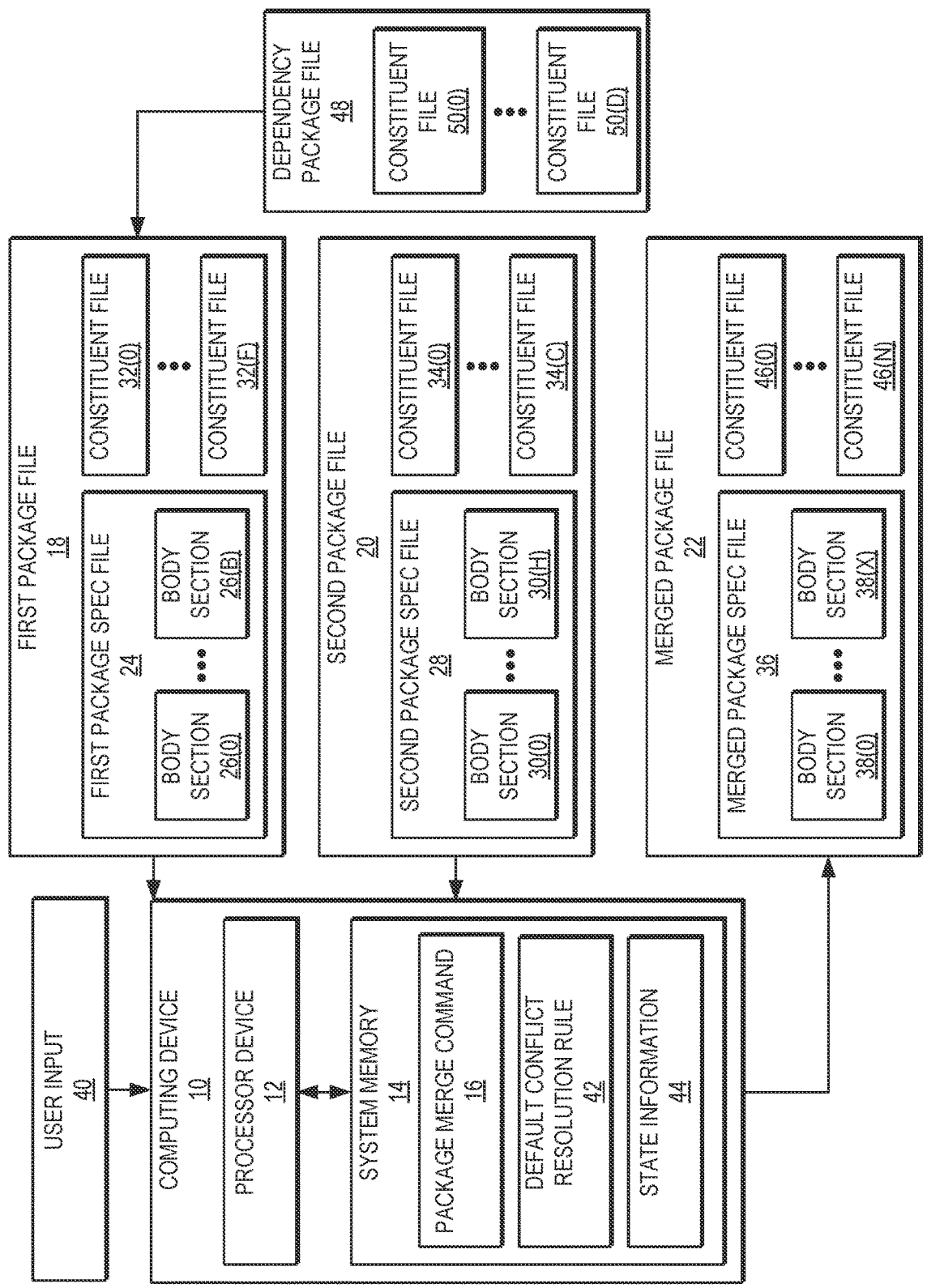
FIG. 1 is a block diagram of a computing device in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first package file" and "second package file," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As noted above, the term "package file" and derivatives thereof are used herein to refer to a file that encapsulates software source code files and/or or binary files and their associated metadata. Package files may include, as a non-limiting example, RPM Package Manager (RPM) files. When used in conjunction with an appropriate package management tool, a package file provides a convenient mechanism for installing, reinstalling, removing, upgrading, and verifying software applications. Additionally, a package file may be digitally signed to enable users to verify the authenticity of the package file.

The metadata included as part of a package file may describe the package file's constituent files, as well as characteristics such as version, release, size, installation instructions, and the like. The metadata may be provided as part of a package specification file contained within a package file (such as a SPEC file of an RPM package file, as a non-limiting example). In particular, the term "package specification file" and derivatives thereof are used herein to refer to a file, included within a package file, that defines metadata that is used by package management software to build and/or install the package file. The package specification file includes a plurality of body sections that may include, as non-limiting examples, a preamble section comprising metadata items used elsewhere in the package specification file, a description section providing a description of the software application contained in the package file, a build section providing commands for building source code files into executable code, an install section providing commands for installing the software application onto a computing device, and/or the like.

Because software applications are conventionally distributed as individual package files, installation of multiple software applications requires the individual execution of multiple package files. This requirement may result in an inconvenient installation process for software bundles that comprise multiple software applications. Additionally, some operating environments may impose strict access restrictions that limit connectivity to external networks, and/or security restrictions that require package files to be subject to an approval process before installation. In such operating environments, operations for transferring and/or seeking approval for multiple package files may present further obstacles to installation of a software bundle.

Accordingly, examples disclosed herein relate to merging multiple package files into a merged package file. In this regard, in some examples, a computing device performs a package file merge by retrieving a first package specification file corresponding to a first package file and a second package specification file corresponding to a second package file. Some examples may provide that retrieving the first package specification file and the second package specification file may be accomplished by executing a package merge command that specifies the first package file and the second package file, and then retrieving the first package specification file and the second package specification file from the first package file and the second package file, respectively. In some examples, retrieving the first package specification file and the second package specification file may be accomplished by executing a package merge command that specifies the first package specification file and the second package specification file directly.

The first package specification file and the second package specification file next are merged into a merged package specification file. According to some examples, merging the first package specification file and the second package specification file may be accomplished by adding each unique body section from the first package specification file and the second package specification file to the merged package specification file. The term "unique body section" and derivatives thereof are used herein to refer to a body section that is present in the first package specification file but not in the second package specification file, or vice versa.

Merging the first package specification file and the second package specification file also comprises combining each corresponding body section from the first package specification file and the second package specification file into a combined body section of the merged package specification file. The term "corresponding body section" and derivatives thereof are used herein to refer to a body section that is present in both the first package specification file and the second package specification file (with the same or different contents). Because corresponding body sections from the first package specification file and the second package specification file may have incompatibilities that can result in conflicts (e.g., name conflicts, dependency version conflicts, and the like, as non-limiting examples), some examples further include mechanisms for detecting and resolving such conflicts. In some examples, conflicts that are detected when combining the corresponding body sections into the combined body section may be resolved based on a user input, or on a previously specified default conflict resolution rule. Some examples may provide that if a conflict is detected, state information indicating a current state of the combining of the corresponding body sections is stored, and the combining operation is aborted. The combining operation may subsequently be resumed (i.e., at the same point at which it aborted) based on the state information. Such examples thus may provide the user with an opportunity to manually resolve the conflict between the first package specification file and the second package specification file, and then pick up the combining operation where it left off (e.g., by re-executed the package merge command).

Finally, a merged package file is generated based on the merged package specification file. The merged package file includes a first plurality of constituent files of the first package file and a second plurality of constituent files of the second package file. Some examples may further provide that constituent files of a dependency package file on which the first package file and/or the second package file depends may also be included in the merged package file. In this manner, the merged package file may be used to distribute and install the software applications provided by both the first package file and the second package file, as well as any file on which the software applications depend. It is to be understood that the operations described above for merging the first package file and the second package file may be extended to merge an arbitrary number of package files into the merged package file.

To illustrate a computing device on which examples may be practiced, FIG. 1 is provided. In FIG. 1, a computing device 10 includes a processor device 12 communicatively coupled to a system memory 14. The computing device 10 of FIG. 1 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some examples of the computing device 10 may include more or fewer elements than illustrated in FIG. 1. For example, the processor device 12 may further include one or more functional units, instruction caches, unified caches, memory controllers, interconnect buses, and/or additional memory devices, caches, and/or controller circuits, which are omitted from FIG. 1 for the sake of clarity.

The processor device 12 in the example of FIG. 1 is configured to execute a package merge command 16 that causes operations to be carried out to merge a first package file 18 and a second package file 20 into a merged package file 22. The first package file 18 and the second package file 20 each may comprise, e.g., an RPM package file, as a non-limiting example. The first package file 18 includes a first package specification file ("FIRST PACKAGE SPEC FILE") 24, which is made up of a plurality of body sections 26(0)-26(B). Similarly, the second package file 20 includes a second package specification file ("SECOND PACKAGE SPEC FILE") 28 that is made up of a plurality of body sections 30(0)-30(H). Each of the first package specification file 24 and the second package specification file 28 may comprise, e.g., an RPM SPEC file, as a non-limiting example.

The body sections 26(0)-26(B) of the first package specification file 24 and the body sections 30(0)-30(H) of the second package specification file 28 may include, as non-limiting examples, a preamble section comprising metadata items used elsewhere in the first package specification file 24 or the second package specification file 28, a description section providing a description of the software application contained in the first package file 18 or the second package file 20, a build section providing commands for building software source code into executable code, an install section providing commands for installing the software application onto the computing device 10, and/or the like. In examples in which the first package specification file 24 and the second package specification file 28 are RPM SPEC files, the body sections 26(0)-26(B) and 30(0)-30(H) each comprise a body section that corresponds to a SPEC directive such as % description, % build, % install, % changelog, and the like.

The first package file 18 also includes a plurality of constituent files 32(0)-32(F), and the second package file 20 likewise includes a plurality of constituent files 34(0)-34(C). The constituent files 32(0)-32(F) and 34(0)-34(C) may comprise source code files and/or binary files, and constitute the software applications encapsulated by the first package file 18 and the second package file 20, respectively. The first package specification file 24 and the second package specification file 28 may be used by a package management tool (not shown) to compile and/or install the respective constituent files 32(0)-32(F) and 34(0)-34(C) according to the metadata provided by the respective body sections 26(0)-26(B) and 30(0)-30(H).

To merge the first package file 18 and the second package file 20, the processor device 12 of the computing device 10 first retrieves the first package specification file 24 and the second package specification file 28. In some examples, the package merge command 16 may specify the first package file 18 and the second package file 20 as parameters, and the processor device 12, in response to executing the package merge command 16, may extract the first package specification file 24 and the second package specification file 28 from the first package file 18 and the second package file 20, respectively. Some examples may provide that the first package specification file 24 and the second package specification file 28 may be made available separately from the corresponding first package file 18 and the second package file 20. Accordingly, in such examples, the package merge command 16 may specify the first package specification file 24 and the second package specification file 28 as parameters, and the processor device 12 may retrieve the first package specification file 24 and the second package specification file 28 (e.g., by reading the first package specification file 24 and the second package specification file 28 from a persistent data store such as a hard drive, as a non-limiting example).

The processor device 12 next merges the first package specification file 24 and the second package specification file 28 into a merged package specification file ("MERGED PACKAGE SPEC FILE") 36 comprising a plurality of body sections 38(0)-38(X). To accomplish the merging of the first package specification file 24 and the second package specification file 28, the processor device 12 may first identify each unique body section (i.e., a body section that is present in one of the first package specification file 24 but not in the second package specification file 28, or vice versa) among the body sections 26(0)-26(B) and 30(0)-30(H). For example, if the first package specification file 24 and the second package specification file 28 are RPM SPEC files, and the body section 26(0) of the first package specification file 24 corresponds to the SPEC directive % install while the second package specification file 28 does not include a body section corresponding to the SPEC directive % install, the unique body section 26(0) of the first package specification file 24 may be added to the merged package specification file 36 unchanged.

Merging the first package specification file 24 and the second package specification file 28 may also include combining corresponding body sections (i.e., body sections that are present in both the first package specification file 24 and the second package specification file 28) among the body sections 26(0)-26(B) and 30(0)-30(H) into a combined body section among the body sections 38(0)-38(X) of the merged package specification file 36. This may require additional logic and/or user input due to the possibility of conflicts between the body sections 26(0)-26(B) of the first package specification file 24 and the body sections 30(0)-30(H) of the second package specification file 28. Potential conflicts may include, as non-limiting examples, name conflicts, dependency version conflicts, changelog conflicts, and/or other incompatible commands or directives within the first package specification file 24 and the second package specification file 28.

In some examples, conflicts that are detected when combining the corresponding body sections among the body sections 26(0)-26(B) and 30(0)-30(H) may be resolved based on a user input 40 provided by a user (not shown). For instance, the merge operation may pause while a prompt is displayed to the user requesting the user input 40. In some examples, a default conflict resolution rule 42 that indicates how specific conflicts should be resolved may be specified in advance, and applied during the combining operation to resolve a detected conflict. Some examples may provide that, if a conflict is detected during the combining operation, state information 44 that indicates a current state of the combining of the corresponding body sections from the first package specification file 24 and the second package specification file 28 is stored, and the combining operation is aborted. The combining operation may subsequently be resumed (i.e., at the same point at which it aborted) based on the state information 44. Such examples thus provide the user an opportunity to manually resolve the conflict between the first package specification file and the second package specification file, and then resume the combining process where it left off (e.g., by re-executing the package merge command 16).

After merging the first package specification file 24 and the second package specification file 28 into the merged package specification file 36, the processor device 12 generates the merged package file 22 based on the merged package specification file 36. The merged package file 22 includes a plurality of constituent files 46(0)-46(N) that includes the constituent files 32(0)-32(F) of the first package file 18 and the constituent files 34(0)-34(C) of the second package file 20. In some examples, files among the constituent files 32(0)-32(F) and/or the constituent files 34(0)-34(C) that are determined to be extraneous, redundant, or otherwise unneeded may be excluded from the constituent files 46(0)-46(N) of the merged package file 22. In this manner, the merged package file may be used to distribute and install the software applications provided by both the first package file and the second package file. It is to be understood that the operations described above for merging the first package file and the second package file may be extended to merge an arbitrary number of package files into the merged package file 22.

Additionally, some examples may provide that a package file such as the first package file 18 depends on a separate dependency package file 48 (e.g., to provide additional functionality) that includes a plurality of constituent files 50(0)-50(D). Accordingly, such examples may provide that operations for merging the first package file 18 and the second package file 20 into the merged package file 22 further include incorporating the constituent files 50(0)-50(D) of the dependency package file 48 into the constituent files 46(0)-46(N) of the merged package file 22. The merged package file 22 generated by such examples can guarantee that all files required to install and execute the software applications encapsulated by the first package file 18 and the second package file 20 are included within the merged package file 22.

Figure 2:
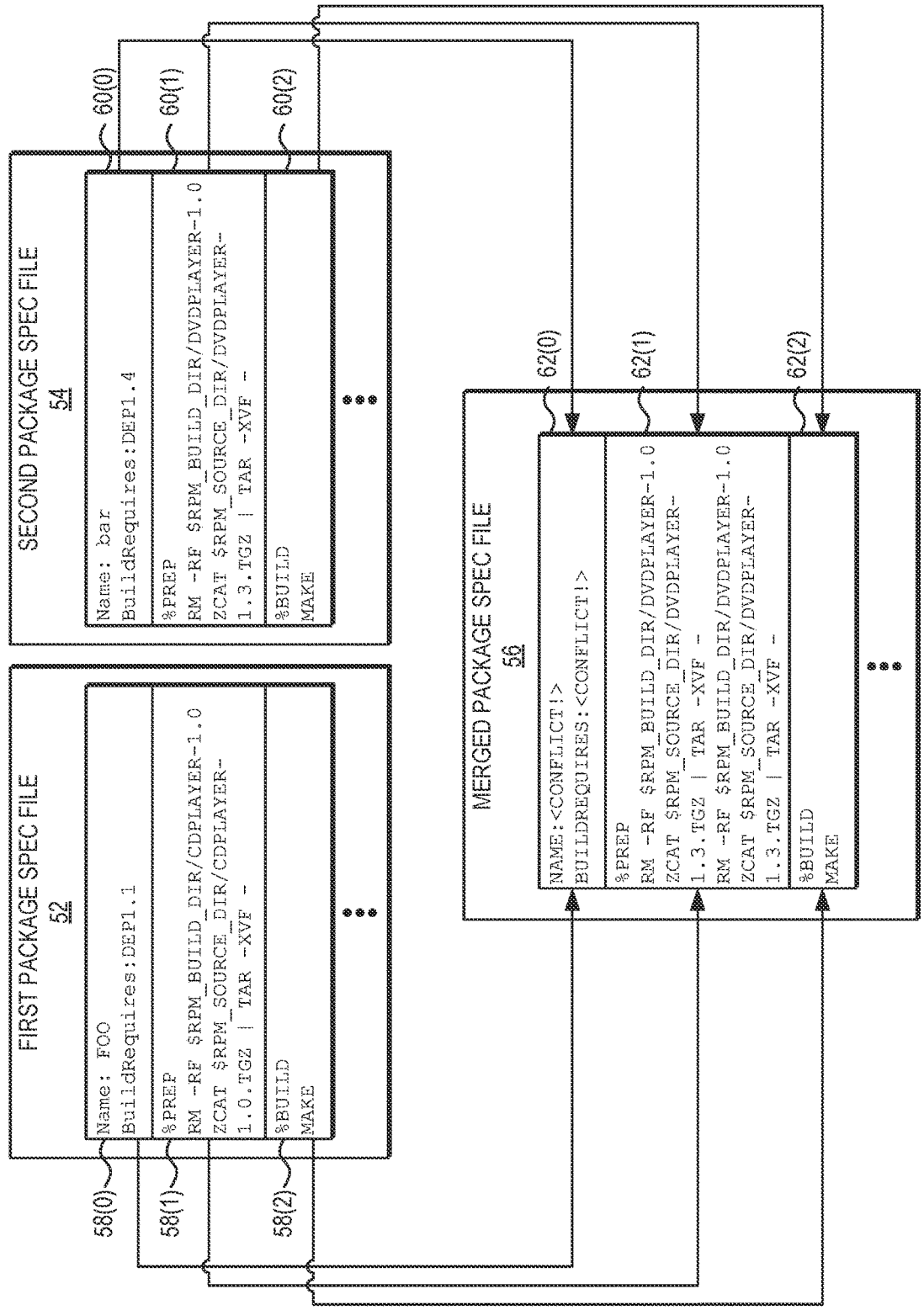
FIG. 2 is a block diagram illustrating merging of two package specification files, according to one example.

To illustrate how body sections, such as the body sections 26(0)-26(B) of the first package specification file 24 and the body sections 30(0)-30(H) of the second package specification file 28 of FIG. 1, may be combined, FIG. 2 is provided. FIG. 2 shows a first package specification file ("FIRST PACKAGE SPEC FILE") 52 and a second package specification file ("SECOND PACKAGE SPEC FILE") 54 that are to be merged into a merged package specification file ("MERGED PACKAGE SPEC FILE") 56. In the example of FIG. 2, the first package specification file 52 and the second package specification file 54 are RMP SPEC files. The first package specification file 52 includes body sections 58(0)-58(2), among others not shown, while the second package specification file 54 includes body sections 60(0)-60(2), among others not shown.

As described above, the process for merging package specification files such as the first package specification file 52 and the second package specification file 54 may include combining corresponding body sections within the first package specification file 52 and the second package specification file 54. In FIG. 2, the body section 58(2) of the first package specification file 52 and the body section 60(2) of the second package specification file 54 both correspond to the SPEC directive % build and include the same contents. Accordingly, the body sections 58(2) and 60(2) are combined into a combined body section 62(2) of the merged package specification file 56. Similarly, the body section 58(1) of the first package specification file 52 and the body section 60(1) of the second package specification file 54 both correspond to the SPEC directive % prep. However, as seen in FIG. 2, the body sections 58(1) and 60(1) include different contents. Consequently, the operation for combining the body sections 58(1) and 60(1) comprises determining that no conflict exists between the body sections 58(1) and 60(1) and merging their contents into a combined body section 62(1) of the merged package specification file 56.

The body section 58(0) of the first package specification file 52 and the body section 60(0) of the second package specification file 54 correspond to SPEC file preambles that each specify a name and a dependency for the respective package specification files. In the example of FIG. 2, though, both the names and the dependencies are different. Thus, the operation for combining the body sections 58(0) and 60(0) into a combined body section 62(0) of the merged package specification file 56 detects the existence of the conflicts. The conflicts then must be resolved as described above, using, e.g., user input or a prespecified default conflict resolution rule.

Figure 3A:
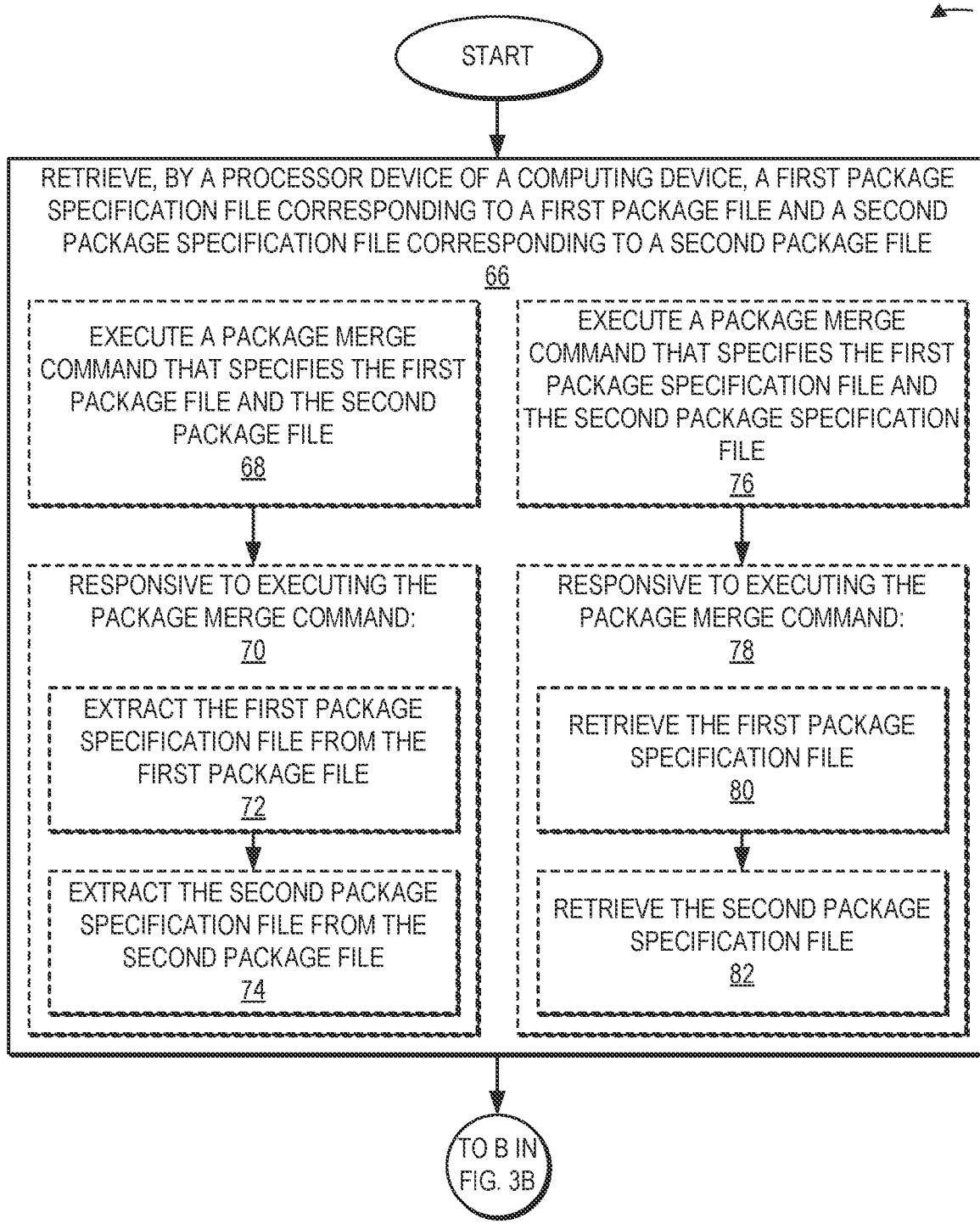
FIGS. 3A and 3B are flowcharts illustrating exemplary operations for merging multiple package files into a merged package file, according to one example.
Figure 3B:
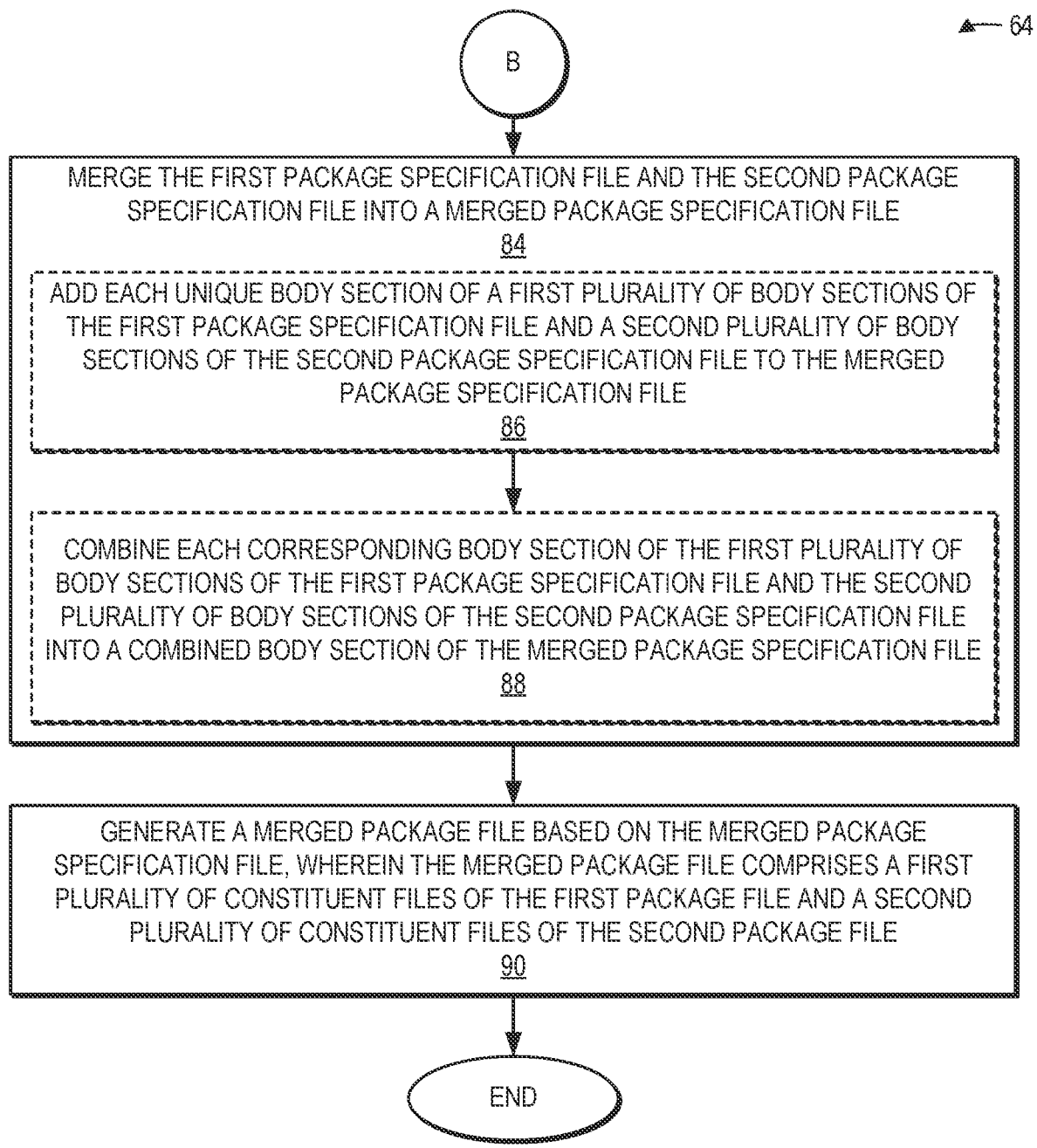

FIGS. 3A and 3B provide a flowchart 64 illustrating exemplary operations for merging multiple package files into a merged package file, according to one example. For the sake of clarity, elements of FIGS. 1 and 2 are referenced in describing FIGS. 3A and 3B. In FIG. 3A, operations in some examples begin with the processor device 12 of the computing device 10 retrieving the first package specification file 24 corresponding to the first package file 18 and the second package specification file 28 corresponding to the second package file 20 (block 66). In some examples, the operations of block 66 for retrieving the first package specification file 24 and the second package specification file 28 may comprise the processor device 12 executing the package merge command 16 that specifies the first package file 18 and the second package file 20 (block 68). In response to executing the package merge command 16 of block 68, the processor device 12 performs a series of operations (block 70). In particular, the processor device 12 extracts the first package specification file 24 from the first package file 18 (block 72). The processor device 12 also extracts the second package specification file 28 from the second package file 20 (block 74).

Some examples may provide that the operations of block 66 for retrieving the first package specification file 24 and the second package specification file 28 may comprise the processor device 12 executing the package merge command 16 that specifies the first package specification file 24 and the second package specification file 28 (block 76). In response to executing the package merge command 16 of block 76, the processor device 12 performs a series of operations (block 78). Specifically, the processor device 12 retrieves the first package specification file 24 (block 80). The processor device 12 also retrieves the second package specification file 28 (block 82). The processor device 12 in some examples may retrieve the first package specification file 24 and the second package specification file 28 by reading the package specification files from a persistent data store such as a hard drive. Operations then resume at block 84 of FIG. 3B.

Referring now to FIG. 3B, the processor device 12 next merges the first package specification file 24 and the second package specification file 28 into the merged package specification file 36 (block 84). According to some examples, the operations of block 84 for merging the first package specification file 24 and the second package specification file 28 into the merged package specification file 36 may comprise adding each unique body section of the first plurality of body sections 26(0)-26(B) of the first package specification file 24 and the second plurality of body sections 30(0)-30(H) of the second package specification file 28 to the merged package specification file 36 (block 86). The processor device 12 also combines each corresponding body section of the first plurality of body sections 26(0)-26(B) of the first package specification file 24 and the second plurality of body sections 30(0)-30(H) of the second package specification file 28 into a combined body section (e.g., the body section 62(1) of FIG. 2) of the merged package specification file 36 (block 88). Finally, the processor device 12 generates the merged package file 22 based on the merged package specification file 36, wherein the merged package file 22 comprises the first plurality of constituent files 32(0)-32(F) of the first package file 18 and the second plurality of constituent files 34(0)-34(C) of the second package file 20 (block 90).

To illustrate exemplary operations for resolving conflicts between corresponding body sections of two package specification files according to one example, FIG. 4 provides a flowchart 92. Elements of FIGS. 1 and 2 are referenced in describing FIG. 4 for the sake of clarity. As seen in FIG. 4, the processor device 12 of the computing device 10 of FIG. 1 combines each corresponding body section of a first plurality of body sections of the first package specification file (e.g., the body sections 58(0)-58(2) of the first package specification file 52 of FIG. 2) and a second plurality of body sections of a second package specification file (e.g., the body sections 60(0)-60(2) of the second package specification file 54 of FIG. 2) into a combined body section of the merged package specification file (e.g., the body sections 62(0)-62(2) of the merged package specification file 56 of FIG. 2) (block 94). It is to be understood that the operations of block 94 of FIG. 4 correspond to the operations of block 88 of FIG. 3B. In some examples, the operations of block 94 for combining each corresponding body section comprises the processor device 12 detecting a conflict between a first corresponding body section (e.g., the body section 58(0) of FIG. 2) of the first plurality of body sections 58(0)-58(2) and a second corresponding body section (e.g., the body section 60(0) of FIG. 2) of the second plurality of body sections 60(0)-60(2) (block 96).

The processor device 12 in some examples may then opt to handle the detected conflict by resolving the conflict based on a user input (e.g., the user input 40 of FIG. 1) or a default conflict resolution rule (e.g., the default conflict resolution rule 42 of FIG. 1) (block 98). Some examples may provide that the processor device 12 handles the detected conflict by storing state information (e.g., the state information 44 of FIG. 1) indicating a current state of the combining of the first corresponding body section 58(0) and the second corresponding body section 60(0) (block 100). The processor device 12 then aborts the combining of the first corresponding body section 58(0) and the second corresponding body section 60(0) (block 102). The processor device 12 subsequently resumes the combining of the first corresponding body section 58(0) and the second corresponding body section 60(0) based on the state information 44 (e.g., after a user has manually resolved the conflict and re-executed the package merge command 16) (block 104).

Figure 5:
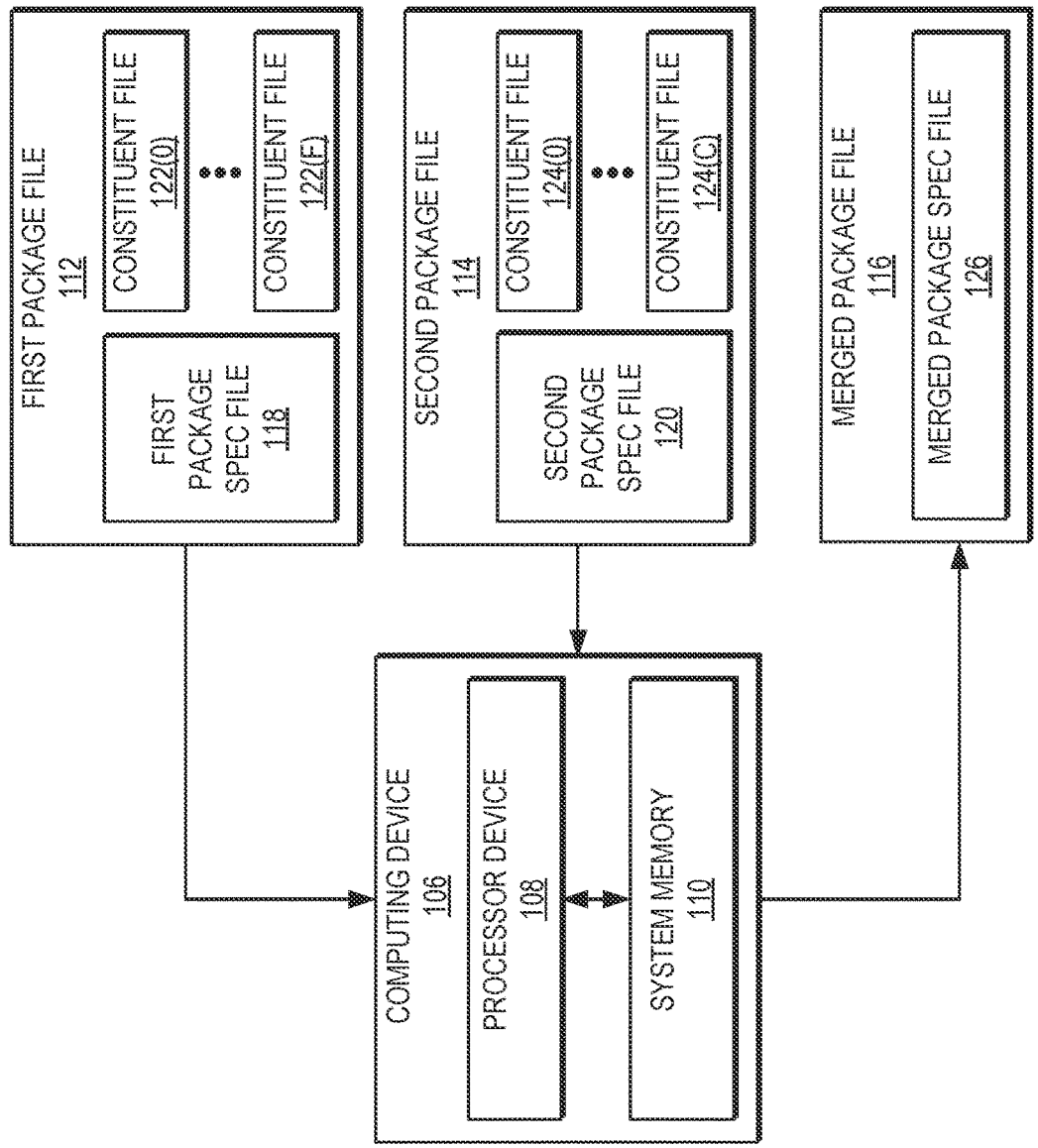
FIG. 5 is a simpler block diagram of the computing device of FIG. 1 for merging multiple package files into a merged package file, according to one example.

FIG. 5 is a simpler block diagram of the computing device 10 of FIG. 1 for merging multiple package files into a merged package file, according to one example. In FIG. 5, a computing device 106 includes a processor device 108 communicatively coupled to a system memory 110. The processor device 108 in the example of FIG. 5 is configured to merge a first package file 112 and a second package file 114 into a merged package file 116. The first package file 112 includes a first package specification file ("FIRST PACKAGE SPEC FILE") 118. Similarly, the second package file 114 includes a second package specification file ("SECOND PACKAGE SPEC FILE") 120. The first package file 112 also includes a plurality of constituent files 122(0)-122(F), and the second package file 114 likewise includes a plurality of constituent files 124(0)-124(C).

To merge the first package file 112 and the second package file 114, the processor device 108 of the computing device 106 first retrieves the first package specification file 118 and the second package specification file 120. The processor device 108 next merges the first package specification file 118 and the second package specification file 120 into a merged package specification file ("MERGED PACKAGE SPEC FILE") 126. After merging the first package specification file 118 and the second package specification file 120 into the merged package specification file 126, the processor device 108 generates the merged package file 116 based on the merged package specification file 126. The merged package file 116 comprises the constituent files 122(0)-122(F) of the first package file 112 and the constituent files 124(0)-124(C) of the second package file 114.

Figure 6:
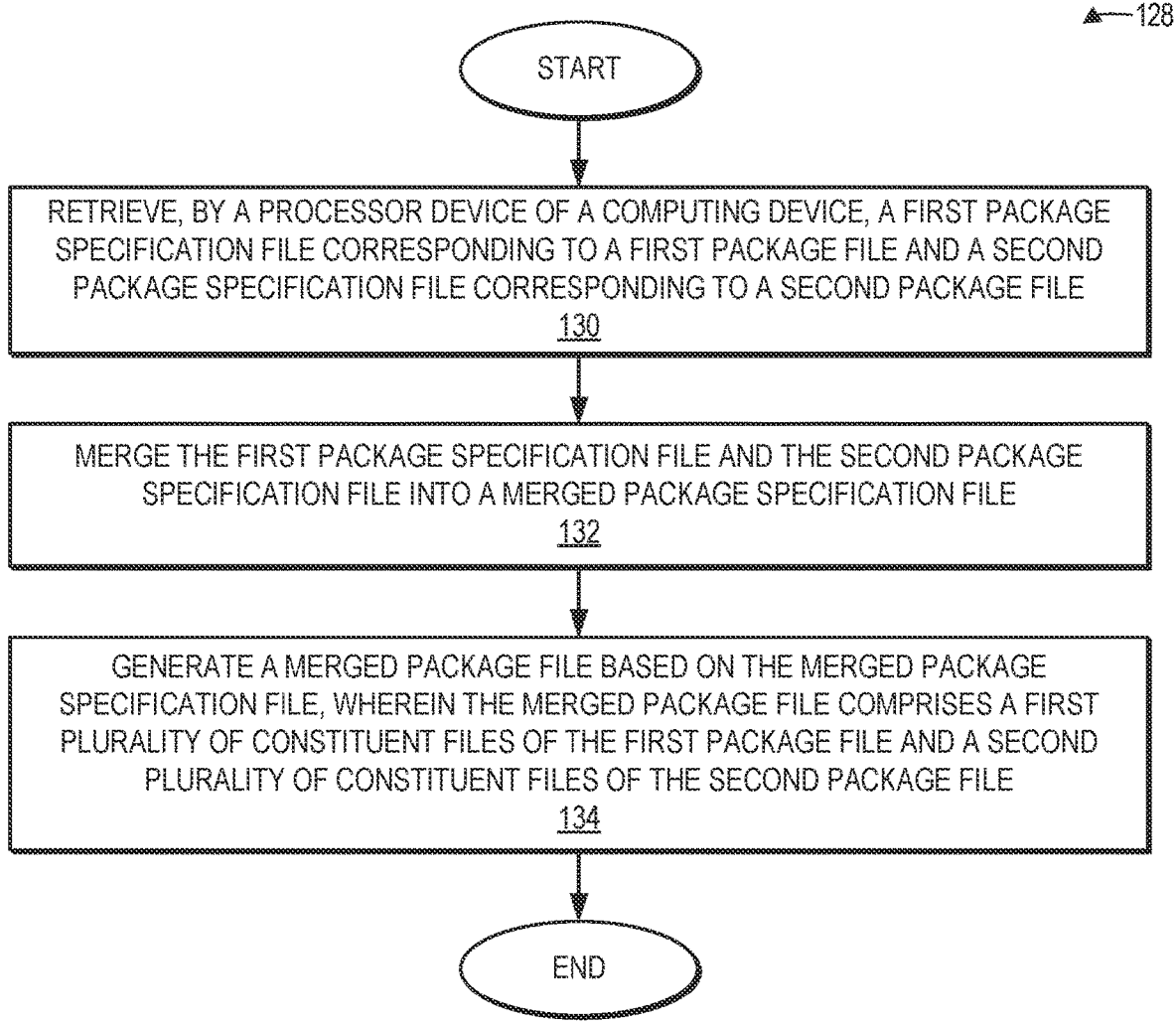
FIG. 6 is a flowchart of a simplified method for merging multiple package files into a merged package file on the computing device of FIG. 5, according to one example.

FIG. 6 provides a flowchart 128 illustrating a simplified method for merging multiple package files into a merged package file using the computing device 106 of FIG. 5, according to one example. Elements of FIG. 5 are referenced in describing FIG. 6 for the sake of clarity. Operations in FIG. 6 begin with the processor device 108 of the computing device 106 retrieving the first package specification file 118 corresponding to the first package file 112 and the second package specification file 120 corresponding to the second package file 114 (block 130). The processor device 108 merges the first package specification file 118 and the second package specification file 120 into the merged package specification file 126 (block 132). The processor device 108 then generates a merged package file 116 based on the merged package specification file 126, wherein the merged package file 116 comprises the first plurality of constituent files 122(0)-122(F) of the first package file 112 and the second plurality of constituent files 124(0)-124(C) of the second package file 114 (block 134).

Figure 7:
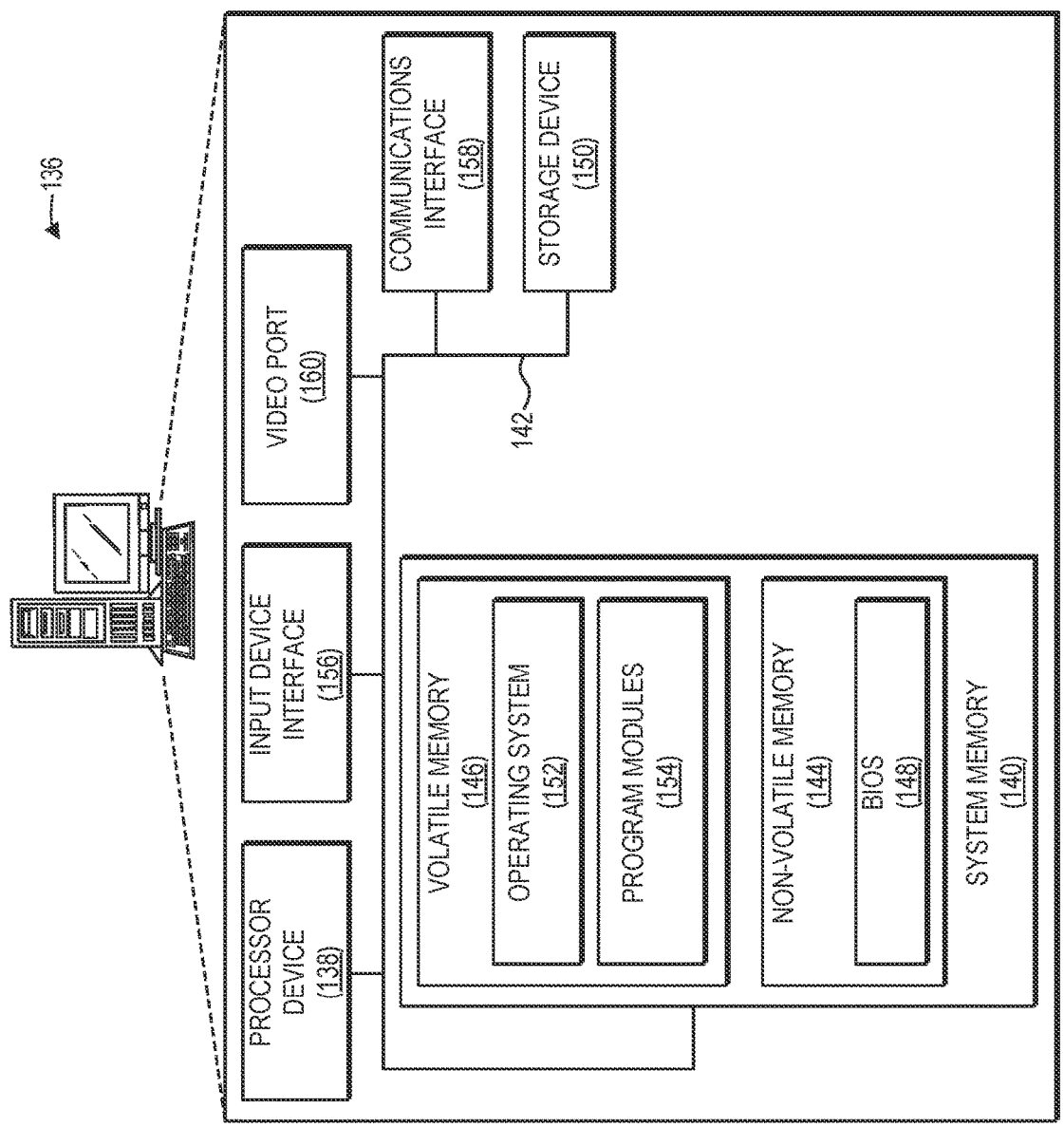
FIG. 7 is a block diagram of a computing device suitable for implementing examples, according to one example.

FIG. 7 is a block diagram of a computing device 136, such as the computing device 10 of FIG. 1 or the computing device 106 of FIG. 5, suitable for implementing examples according to one example. The computing device 136 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 136 includes a processor device 138, a system memory 140, and a system bus 142. The system bus 142 provides an interface for system components including, but not limited to, the system memory 140 and the processor device 138. The processor device 138 can be any commercially available or proprietary processor.

The system bus 142 may be any of several types of bus structures that may further interconnect to a memory bus (with or without a memory controller), a peripheral bus, and/or a local bus using any of a variety of commercially available bus architectures. The system memory 140 may include non-volatile memory 144 (e.g., read-only memory (ROM), erasable programmable ROM (EPROM), electrically EPROM (EEPROM), etc.), and volatile memory 146 (e.g., random access memory (RAM)). A basic input/output system (BIOS) 148 may be stored in the non-volatile memory 144 and can include the basic routines that help to transfer information among elements within the computing device 136. The volatile memory 146 may also include a high-speed RAM, such as static RAM, for caching data.

The computing device 136 may further include or be coupled to a non-transitory computer-readable storage medium such as a storage device 150, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 150 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 150 and in the volatile memory 146, including an operating system 152 and one or more program modules 154 which may implement the functionality described herein in whole or in part. It is to be appreciated that the examples can be implemented with various commercially available operating systems 152 or combinations of operating systems 152. All or a portion of the examples may be implemented as a computer program product stored on a transitory or non-transitory computer-usable or computer-readable storage medium, such as the storage device 150, which includes complex programming instructions, such as complex computer-readable program code, to cause the processor device 138 to carry out the steps described herein. Thus, the computer-readable program code can comprise software instructions for implementing the functionality of the examples described herein when executed on the processor device 138. The processor device 138 may serve as a controller, or control system, for the computing device 136 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 138 through an input device interface 156 that is coupled to the system bus 142 but can be connected by other interfaces, such as a parallel port, an Institute of Electrical and Electronic Engineers (IEEE) 13134 serial port, a Universal Serial Bus (USB) port, an infrared (IR) interface, and the like.

The computing device 136 may also include a communications interface 158 suitable for communicating with a network as appropriate or desired. The computing device 136 may also include a video port 160 to interface with a display device to provide information to a user. Individuals will recognize improvements and modifications to the preferred examples of the disclosure. All such improvements and modifications are considered within the scope of the concepts disclosed herein and the claims that follow.

What is claimed is:

1. A method, comprising:
   retrieving, by a processor device of a computing device, a first package specification file corresponding to a first package file and a second package specification file corresponding to a second package file;
   merging the first package specification file and the second package specification file into a merged package specification file, wherein merging the first package specification file and the second package specification file into the merged package specification file comprises:
      adding each unique body section of a first plurality of body sections of the first package specification file and a second plurality of body sections of the second package specification file to the merged package specification file; and
      combining each corresponding body section of the first plurality of body sections of the first package specification file and the second plurality of body sections of the second package specification file into a combined body section of the merged package specification file; and
   generating a merged package file based on the merged package specification file, wherein the merged package file comprises a first plurality of constituent files of the first package file and a second plurality of constituent files of the second package file.

2. The method of claim 1, wherein retrieving the first package specification file and the second package specification file comprises:
   executing a package merge command that specifies the first package file and the second package file; and
   responsive to executing the package merge command:
      extracting the first package specification file from the first package file; and
      extracting the second package specification file from the second package file.

3. The method of claim 1, wherein retrieving the first package specification file and the second package specification file comprises:
   executing a package merge command that specifies the first package specification file and the second package specification file; and
   responsive to executing the package merge command:
      retrieving the first package specification file; and
      retrieving the second package specification file.

4. The method of claim 1, wherein combining each corresponding body section of the first plurality of body sections of the first package specification file and the second plurality of body sections of the second package specification file into the combined body section of the merged package specification file comprises:
   detecting a conflict between a first corresponding body section of the first plurality of body sections and a second corresponding body section of the second plurality of body sections; and
   resolving the conflict based on a default conflict resolution rule.

5. The method of claim 1, wherein combining each corresponding body section of the first plurality of body sections of the first package specification file and the second plurality of body sections of the second package specification file into the combined body section of the merged package specification file comprises:
   detecting a conflict between a first corresponding body section of the first plurality of body sections and a second corresponding body section of the second plurality of body sections;
   storing state information indicating a current state of the combining of the first corresponding body section and the second corresponding body section;
   aborting the combining of the first corresponding body section and the second corresponding body section; and subsequently resuming the combining of the first corresponding body section and the second corresponding body section based on the state information.

6. The method of claim 1, wherein the merged package file further comprises a third plurality of constituent files of a dependency package file on which the first package file or the second package file depends.

7. A computing device, comprising:
a system memory; and
a processor device coupled to the system memory to:
retrieve a first package specification file corresponding to a first package file and a second package specification file corresponding to a second package file;
merge the first package specification file and the second package specification file into a merged package specification file, wherein to merge the first package specification file and the second package specification file into the merged package specification file is to:
add each unique body section of a first plurality of body sections of the first package specification file and a second plurality of body sections of the second package specification file to the merged package specification file; and
combine each corresponding body section of the first plurality of body sections of the first package specification file and the second plurality of body sections of the second package specification file into a combined body section of the merged package specification file; and
generate a merged package file based on the merged package specification file, wherein the merged package file comprises a first plurality of constituent files of the first package file and a second plurality of constituent files of the second package file.

8. The computing device of claim 7, wherein to retrieve the first package specification file and the second package specification file is to:
execute a package merge command that specifies the first package file and the second package file; and
responsive to executing the package merge command:
extract the first package specification file from the first package file; and
extract the second package specification file from the second package file.

9. The computing device of claim 7, wherein to retrieve the first package specification file and the second package specification file is to:
execute a package merge command that specifies the first package specification file and the second package specification file; and
responsive to executing the package merge command:
retrieve the first package specification file; and
retrieve the second package specification file.

10. The computing device of claim 7, wherein to combine each corresponding body section of the first plurality of body sections of the first package specification file and the second plurality of body sections of the second package specification file into the combined body section of the merged package specification file is to:
detect a conflict between a first corresponding body section of the first plurality of body sections and a second corresponding body section of the second plurality of body sections; and
resolve the conflict based on a default conflict resolution rule.

11. The computing device of claim 7, wherein to combine each corresponding body section of the first plurality of body sections of the first package specification file and the second plurality of body sections of the second package specification file into the combined body section of the merged package specification file is to:
detect a conflict between a first corresponding body section of the first plurality of body sections and a second corresponding body section of the second plurality of body sections;
store state information indicating a current state of the combining of the first corresponding body section and the second corresponding body section;
abort the combining of the first corresponding body section and the second corresponding body section; and
subsequently resume the combining of the first corresponding body section and the second corresponding body section based on the state information.

12. The computing device of claim 7, wherein the merged package file further comprises a third plurality of constituent files of a dependency package file on which the first package file or the second package file depends.

13. A non-transitory computer-readable medium having stored thereon computer-executable instructions which, when executed by a processor device, cause the processor device to:
retrieve a first package specification file corresponding to a first package file and a second package specification file corresponding to a second package file;
merge the first package specification file and the second package specification file into a merged package specification file, wherein to merge the first package specification file and the second package specification file into the merged package specification file is to:
add each unique body section of a first plurality of body sections of the first package specification file and a second plurality of body sections of the second package specification file to the merged package specification file; and
combine each corresponding body section of the first plurality of body sections of the first package specification file and the second plurality of body sections of the second package specification file into a combined body section of the merged package specification file; and
generate a merged package file based on the merged package specification file, wherein the merged package file comprises a first plurality of constituent files of the first package file and a second plurality of constituent files of the second package file.

14. The non-transitory computer-readable medium of claim 13, wherein the computer-executable instructions cause the processor device to retrieve the first package specification file and the second package specification file by causing the processor device to:
execute a package merge command that specifies the first package file and the second package file; and
responsive to executing the package merge command:
extract the first package specification file from the first package file; and
extract the second package specification file from the second package file.

15. The non-transitory computer-readable medium of claim 13, wherein the computer-executable instructions cause the processor device to retrieve the first package specification file and the second package specification file by causing the processor device to:

execute a package merge command that specifies the first package specification file and the second package specification file; and responsive to executing the package merge command:
retrieve the first package specification file; and
retrieve the second package specification file.

16. The non-transitory computer-readable medium of claim 13, wherein the computer-executable instructions cause the processor device to combine each corresponding body section of the first plurality of body sections of the first package specification file and the second plurality of body sections of the second package specification file into the combined body section of the merged package specification file by causing the processor device to:
  detect a conflict between a first corresponding body section of the first plurality of body sections and a second corresponding body section of the second plurality of body sections; and
  resolve the conflict based on a default conflict resolution rule.

17. The non-transitory computer-readable medium of claim 13, wherein the computer-executable instructions cause the processor device to combine each corresponding body section of the first plurality of body sections of the first package specification file and the second plurality of body sections of the second package specification file into the combined body section of the merged package specification file by causing the processor device to:
  detect a conflict between a first corresponding body section of the first plurality of body sections and a second corresponding body section of the second plurality of body sections;
  store state information indicating a current state of the combining of the first corresponding body section and the second corresponding body section;
  abort the combining of the first corresponding body section and the second corresponding body section; and
  subsequently resume the combining of the first corresponding body section and the second corresponding body section based on the state information.

\* \* \* \* \*